United States Patent
Li

(10) Patent No.: US 8,891,918 B2
(45) Date of Patent: Nov. 18, 2014

(54) METHODS, SYSTEMS, AND PRODUCTS FOR IMAGE DISPLAYS

(75) Inventor: Kevin A. Li, New York, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 134 days.

(21) Appl. No.: 13/298,480

(22) Filed: Nov. 17, 2011

(65) Prior Publication Data

US 2013/0129282 A1 May 23, 2013

(51) Int. Cl.
*G02B 6/26* (2006.01)
*F21V 8/00* (2006.01)

(52) U.S. Cl.
CPC ............ *G02B 6/0018* (2013.01); *G02B 6/0028* (2013.01); *G02B 6/005* (2013.01)
USPC ............................................. 385/31; 385/146

(58) Field of Classification Search
None
See application file for complete search history.

(56) References Cited

U.S. PATENT DOCUMENTS

| | | | |
|---|---|---|---|
| 4,309,070 A * | 1/1982 | St. Leger Searle | ............... 345/7 |
| 5,319,491 A | 6/1994 | Selbrede | |
| 5,396,350 A | 3/1995 | Beeson et al. | |
| 5,596,671 A | 1/1997 | Rockwell, III | |
| 6,064,784 A | 5/2000 | Whitehead et al. | |
| 6,352,350 B1 | 3/2002 | Ma | |
| 6,592,234 B2 | 7/2003 | Epstein et al. | |
| 6,750,996 B2 | 6/2004 | Jagt et al. | |
| 6,891,658 B2 | 5/2005 | Whitehead et al. | |
| 7,093,968 B2 | 8/2006 | Hsueh et al. | |
| 7,164,536 B2 | 1/2007 | Whitehead | |
| 7,507,012 B2 | 3/2009 | Aylward et al. | |
| 7,515,326 B2 | 4/2009 | Selbrede et al. | |
| 7,611,271 B2 | 11/2009 | Meis et al. | |
| 7,660,509 B2 | 2/2010 | Bryan et al. | |
| 7,740,387 B2 | 6/2010 | Schultz et al. | |
| 7,775,700 B2 | 8/2010 | Lee | |
| 8,243,424 B1 | 8/2012 | Babu et al. | |
| 8,345,073 B1 | 1/2013 | Hebenstreit et al. | |
| 8,416,365 B1 | 4/2013 | Rosenberg et al. | |
| 2004/0085649 A1* | 5/2004 | Repetto et al. ................. 359/633 |
| 2007/0008739 A1 | 1/2007 | Kim et al. | |
| 2007/0019434 A1 | 1/2007 | Lee | |
| 2007/0263137 A1 | 11/2007 | Shigeta et al. | |
| 2008/0219024 A1 | 9/2008 | Mi et al. | |
| 2008/0239422 A1* | 10/2008 | Noda ............... 359/13 |
| 2009/0262083 A1 | 10/2009 | Parekh | |
| 2010/0079843 A1 | 4/2010 | Derichs et al. | |
| 2010/0260455 A1* | 10/2010 | Pascal et al. .................... 385/36 |
| 2011/0043435 A1 | 2/2011 | Hebenstreit et al. | |
| 2012/0057253 A1* | 3/2012 | Takagi et al. .................. 359/861 |
| 2012/0140515 A1* | 6/2012 | Li ................... 362/603 |

OTHER PUBLICATIONS

Baudisch, Patrick et al., "Lumino: Tangible Blocks for Tabletop Computers Based on Glass Fiber Bundles", Hasso Plattner Institute, Germany, 10 pages, 2010.

* cited by examiner

*Primary Examiner* — Mike Stahl
(74) *Attorney, Agent, or Firm* — Scott P. Zimmerman, PLLC

(57) ABSTRACT

Methods, systems, and products illuminate display devices. An image is injected into a tapered portion of a waveguide. The tapered portion reflects the image to create total internal reflectance of the image within the waveguide. A frustrator withdraws a frustrated image from the waveguide, and the frustrated image is displayed to a viewer.

17 Claims, 18 Drawing Sheets

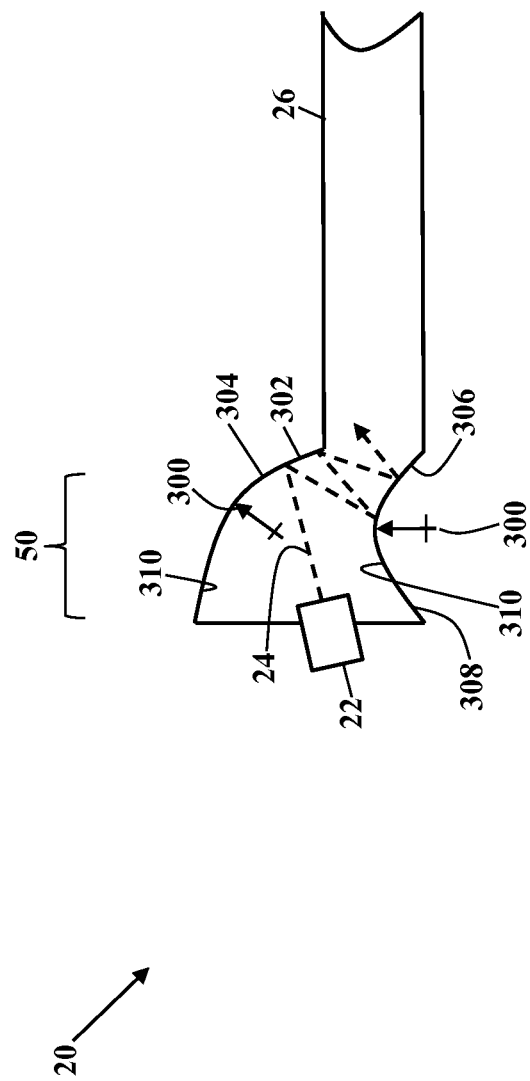

METHODS, SYSTEMS, AND PRODUCTS FOR IMAGE DISPLAYS

COPYRIGHT NOTIFICATION

A portion of the disclosure of this patent document and its attachments contain material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND

Electronic displays are commonly used as output devices. Flat-panel displays, for example, are used in computers, phones, and entertainment systems to display movies, pictures, and other content.

BRIEF DESCRIPTION OF THE SEVERAL VIEWS OF THE DRAWINGS

The features, aspects, and advantages of the exemplary embodiments are better understood when the following Detailed Description is read with reference to the accompanying drawings, wherein:

FIG. 18 is another partial sectional view illustrating radii of curvature, according to exemplary embodiments.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
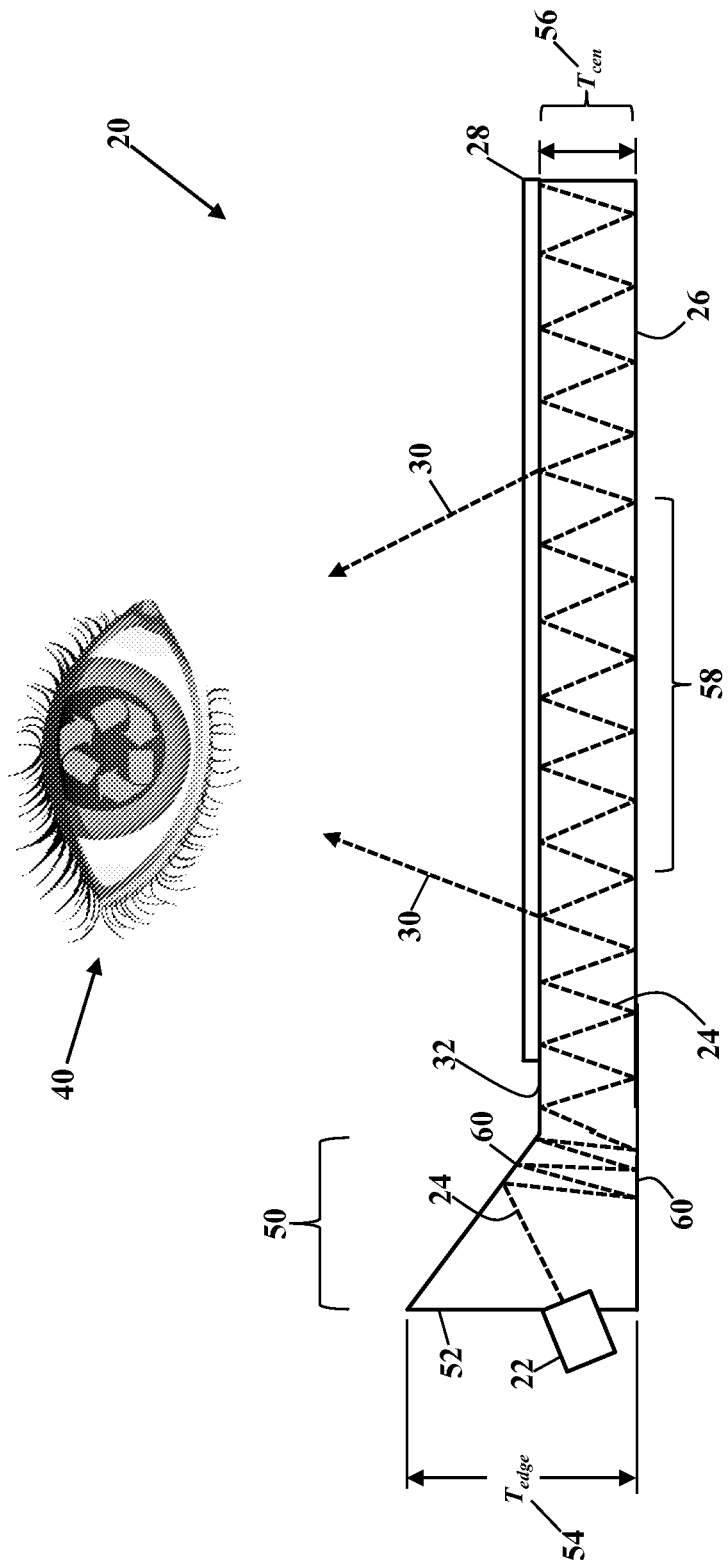
FIG. 1 is a simplified sectional view of a display device, according to exemplary embodiments.

FIG. 1 is a simplified sectional view of a display device 20, according to exemplary embodiments. The display device 20 is enlarged for clarity of features. A projector 22 injects or emits an image 24 into a waveguide 26. The image 24 may be injected at an angle such that total internal reflection (or "TIR") is obtained. Because the injected image 24 is totally internally reflected within the waveguide 26, a frustrator 28 may cause a frustrated image 30 to exit a surface 32 of the waveguide 26. The frustrated image 30 may then be presented to a viewer's eye 40.

Total internal reflection (or "TIR") is obtained. As FIG. 1 illustrates, the image 24 may be injected into a tapered cross-section 50 of the waveguide 26. That is, an outer edge 52 of the waveguide 26 may have a greater cross-sectional thickness $T_{edge}$ (illustrated as reference numeral 54) than a cross-sectional thickness $T_{cen}$ (illustrated as reference numeral 56) of a thinner central region 58 of the waveguide 26. The tapered cross-section 50 internally reflects and focuses the image 24 injected or emitted from the projector 22. As the incident image 24 encounters an angled surface 60 in the tapered cross-section 50, the image 24 reflects such that an angle of incidence is equal to an angle of reflection, according to the Snell's law of reflection. The tapered cross-section 50 may thus have a wedge shape with one or more of the angled surfaces 60. Each angled surface 60 further reflects a path of the image 24 within the tapered cross-section 50. The image 24 is thus focused and injected into the central region 58 of the waveguide 26 at an angle such that the total internal reflection (or "TIR") is obtained within the central region 58. The total internal reflection and the frustrated total internal reflection are well known physical and optical phenomena to those of ordinary skill in the art. This disclosure, then, need not further explain either phenomena.

Figure 2:
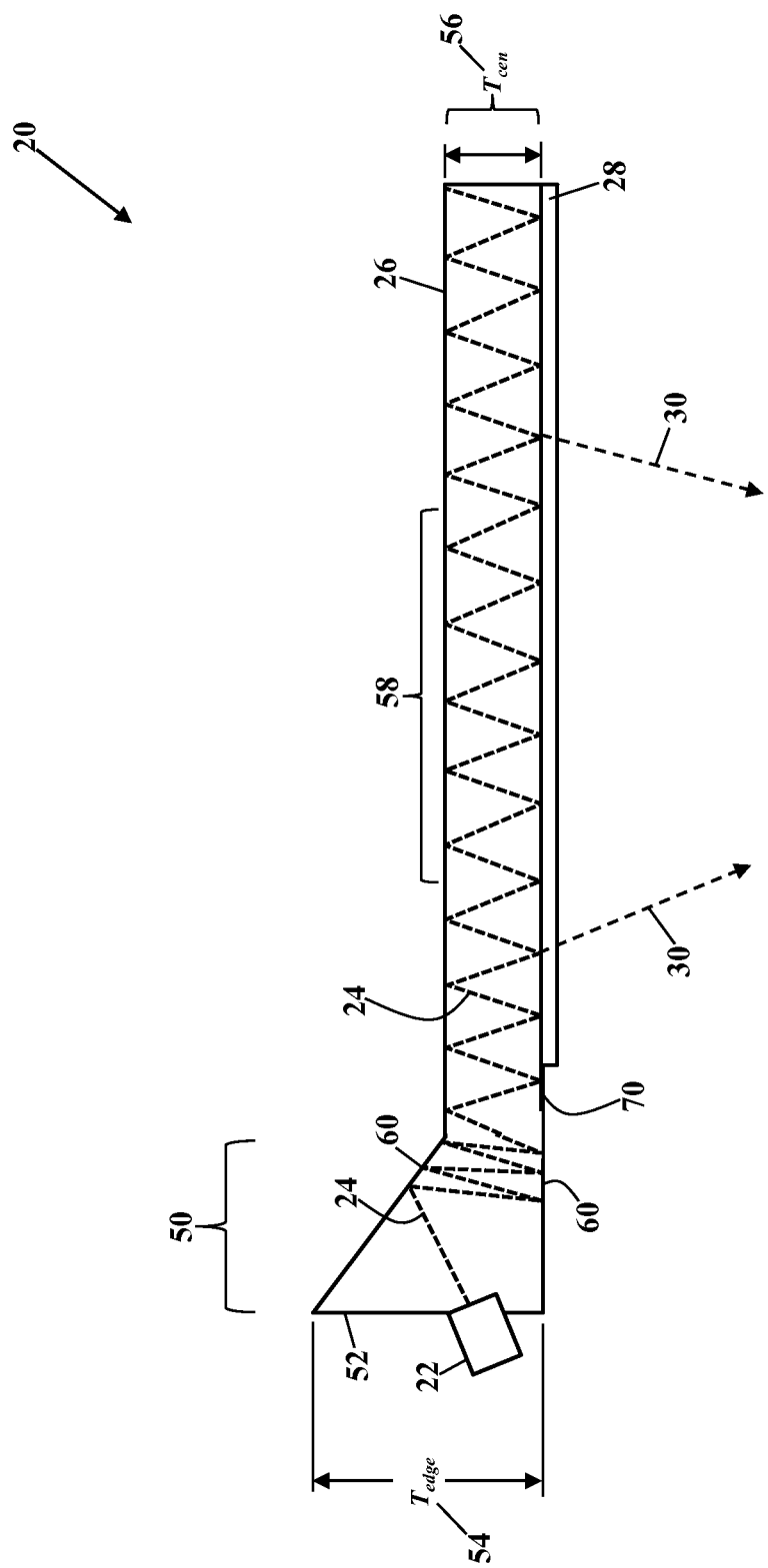
FIGS. 2-3 are more sectional views of the display device, according to exemplary embodiments.

FIG. 2 is another sectional view of the display device 20, according to exemplary embodiments. Here the frustrator 28 is oriented on an opposite side 60 of the waveguide 26. Whereas FIG. 1 illustrated the frustrator 28 oriented to withdraw the frustrated image 30 from the top surface 32 of the waveguide 26, FIG. 2 illustrates the frustrator 28 may be oriented to withdraw the frustrated image 30 from a bottom surface 70 of the waveguide 26. The projector 22 injects the image 24 into the tapered cross-section 50 of the waveguide 26. The one or more angled surfaces 60 of the tapered cross-section 50 reflect and focus the image 24 to create total internal reflection within the central region 58. The frustrator 28 withdraws the frustrated image 30.

Figure 3:
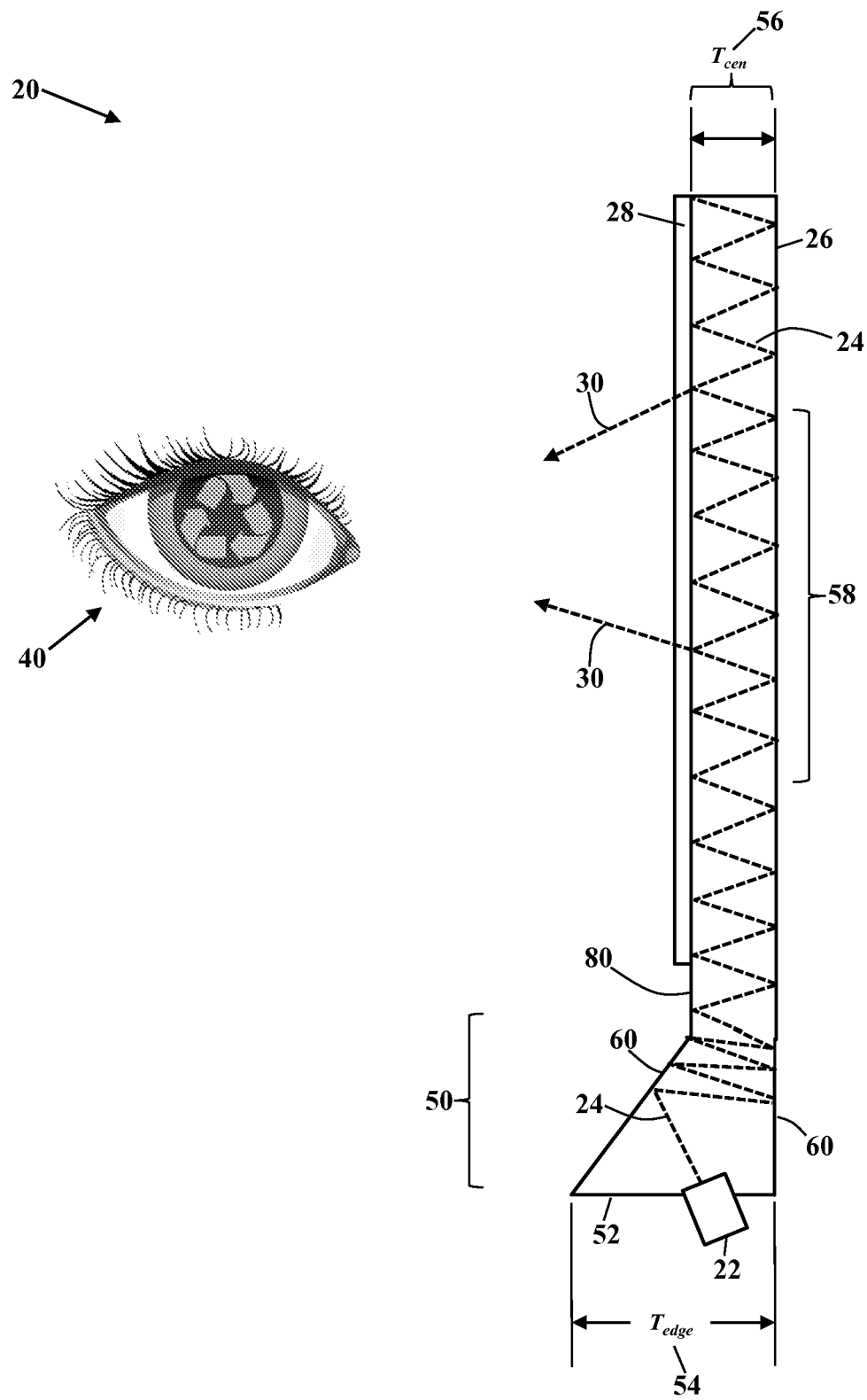

FIG. 3 is another sectional view of the display device 20, according to exemplary embodiments. Here, though, terminology is changed to illustrate a vertical orientation of the display device 20. The image 24 is injected into the tapered cross-section 50 of the waveguide 26. The image 24 is reflected by the one or more of the angled surfaces 60, such that the image 24 is focused to create total internal reflectance in the central region 58 of the waveguide 26. The frustrator 28 is placed or applied to an outer (or left) surface 80 of the waveguide 26, thus causing the frustrated image 30 to exit the outer surface 80. The frustrated image 30 then travels to the viewer's eye 40.

The projector 22 be any device and utilize any image technology. The projector 22, for example, may be a micro-projector or pico-projector that projects the image 24. These image devices are increasingly found in compact portable devices, such as mobile phones, personal digital assistants, and digital cameras. These image devices may inject light of any frequency in the electromagnetic spectrum. These image devices generally comprise a power device (such as a DC battery or AC), electronics, laser light source(s), combiner optic, and scanning mirrors. Because these image devices are known, this disclosure need not provide a further discussion.

The frustrator 28 may be of any design. The frustrator 28, for example, may be any metallic cladding applied to any surface of the waveguide 26, thus causing the frustrated image 30 to locally exit the waveguide 26. The frustrator 28, however, may be any non-metallic coating applied to the waveguide 26. The frustrator 28, for example, may be any polymeric or elastomeric thin film, sheet, or material that is applied or adhered to the waveguide 26. The frustrator 28, in other words, may be any transparent or semi-transparent material that extracts the frustrated image 30 from the waveguide 26.

The waveguide 26 may also be of any shape and design. The waveguide 26 generally has a planar cross-section, although opposite surfaces and/or sides need not be parallel. A bottom surface of the waveguide 26 and a top surface of the waveguide 26, for example, may be parallel. The bottom surface and the outer surface, however, may not be parallel, thus contributing to the wedge-shaped cross-section. Moreover, the waveguide 26 may have any number of edges or sides. The waveguide 26, for example, may have a rectangular top or plan view, thus having four (4) edges or sides. The waveguide 26, however, may have a triangular shape (e.g., three sides or edges) when viewed from above (plan view). The waveguide 26, however, may have more than four edges, such as a pentagonal or hexagonal shape when viewed from above. The waveguide 26 may also be constructed or formed of any material, such as glass, polymer, and/or acrylic. The waveguide 26 may also be transparent or even semi-transparent.

Figure 4:
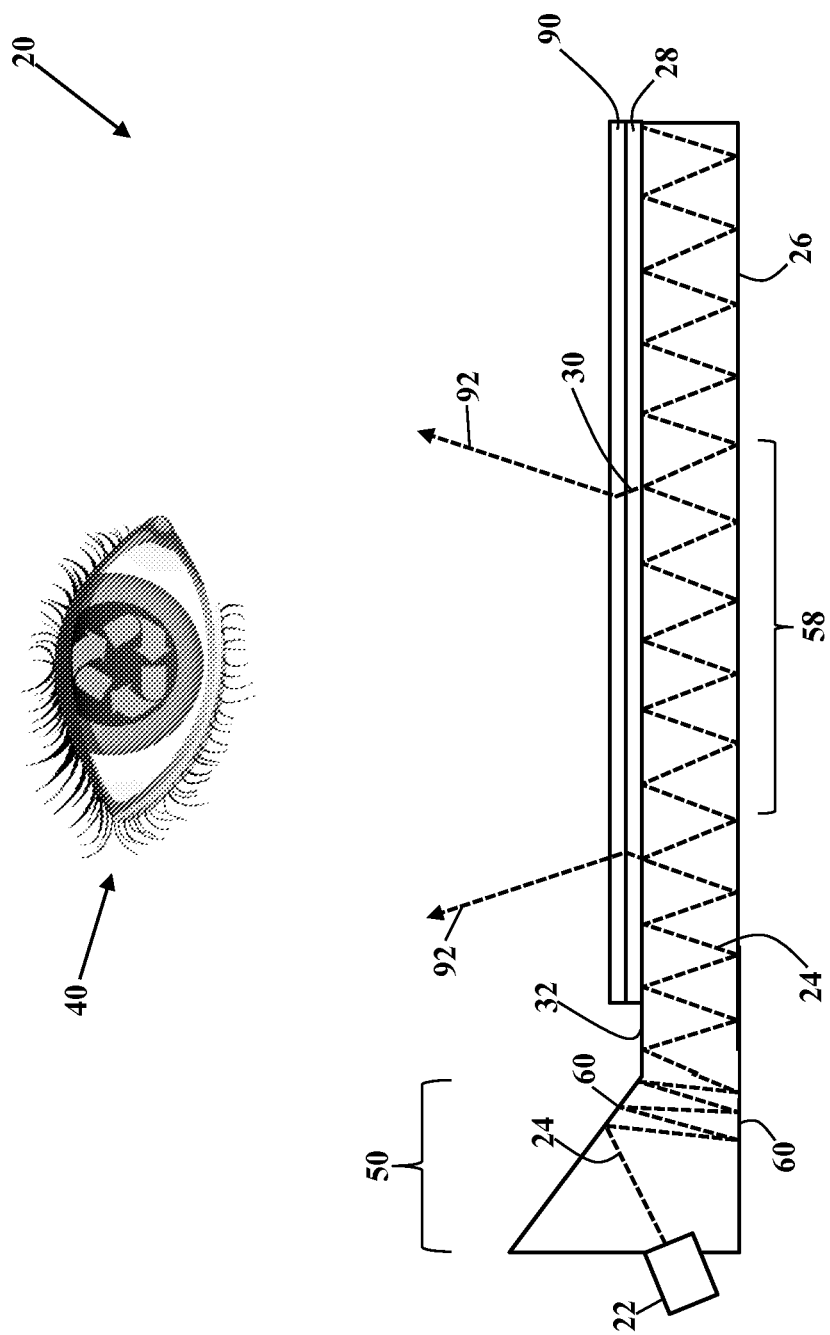
FIGS. 4-6 are more schematics illustrating the display device, according to exemplary embodiments.
Figure 5:
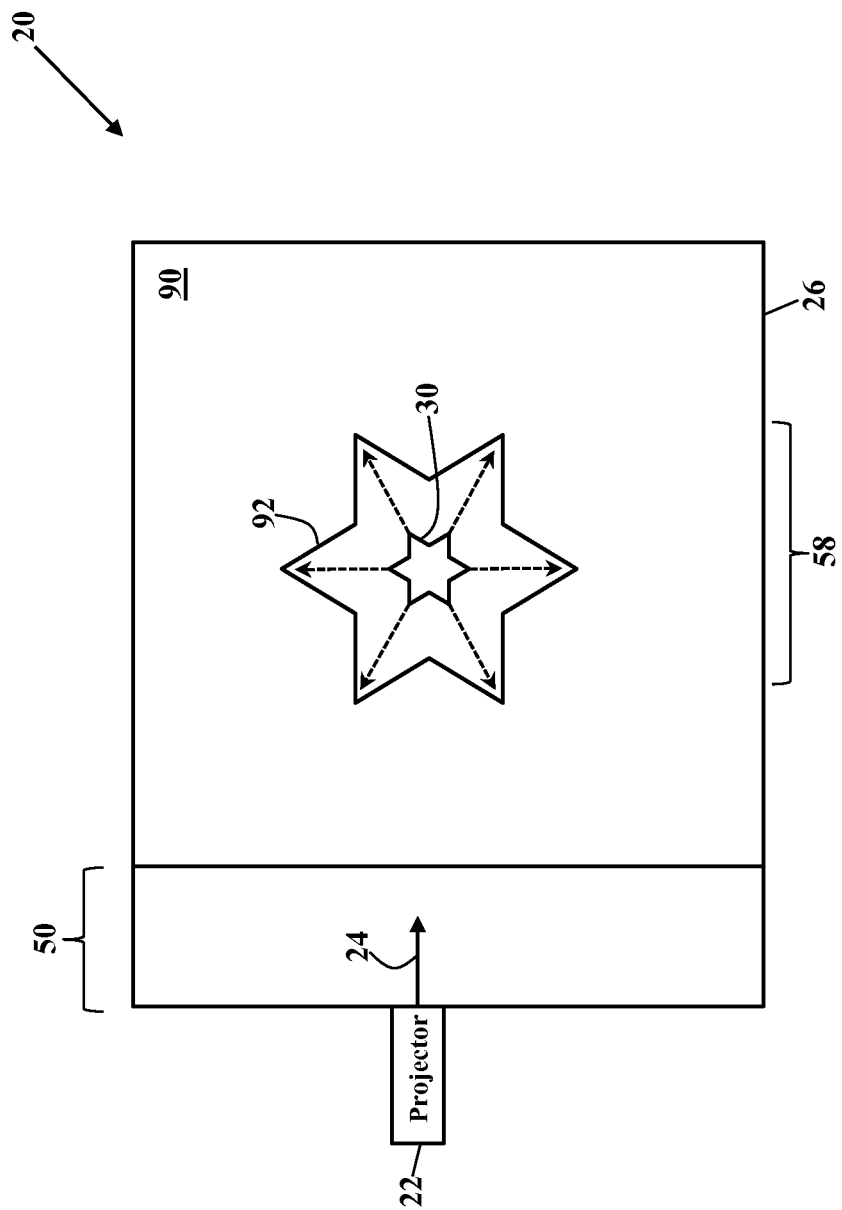
Figure 6:
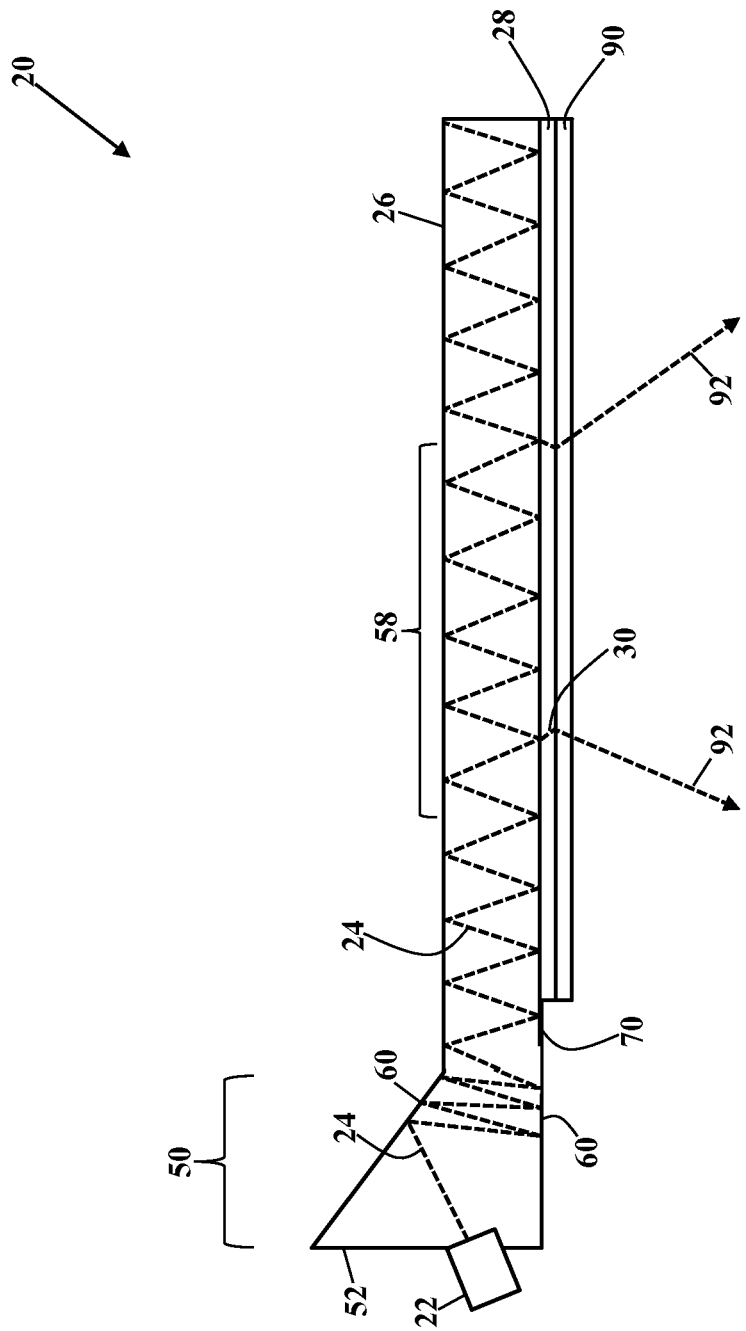

FIGS. 4-6 are more schematics illustrating the display device 20, according to exemplary embodiments. The features of the display device 20 are enlarged for clarity. Here a diffuser 90 may be used to diffuse, or spread out, the frustrated image 30. As the frustrator 28 withdraws the frustrated image 30 from the waveguide 26, the frustrated image 30 may be too small for adequate human perception. Perception may be especially acute for mobile smart phones and music players having small display devices. The diffuser 90, then, may be used to optically diffuse the frustrated image 30 for enhanced perception. FIG. 4 is another cross-sectional illustration showing the diffuser 90 spreading out the frustrated image 30, while FIG. 5 is a top view of the display device 20 showing a diffused image 92. As earlier paragraphs explained, the image 24 is injected into the tapered cross-section 50 of the waveguide 26. The image 24 is reflected and focused by the tapered cross-section 50 to create total internal reflectance in the central region 58 of the waveguide 26. The frustrator 28 withdraws the frustrated image 30 from the waveguide 26, and the diffuser 90 optically produces the diffused image 92. Because the frustrator 28 and the separate diffuser 90 may be different media, the frustrated image 30 refracts at a boundary between the frustrator 28 and the diffuser 90. The diffuser 90 thus spreads out or diffuses the frustrated image 30 to optically produce the diffused image 92. FIG. 6 is another cross-section illustration of the display device 20 showing the diffuser 90 may also be configured for any side of the waveguide 26.

The diffuser 90 may be of any design. The diffuser 90, for example, may be any non-metallic and/or dielectric material of any thickness having an indices of refraction. The diffuser 90 may be a film, paste, cladding, coating, or paint for optical diffusion. The diffuser 90, though, may also be any metallic and/or magnetic material that produces optical diffusion. The diffuser 90 may be any transparent or semi-transparent material that produces the diffused image 92. Moreover, the diffuser 90 may be tinted or colored for enhanced effect.

Figure 7:
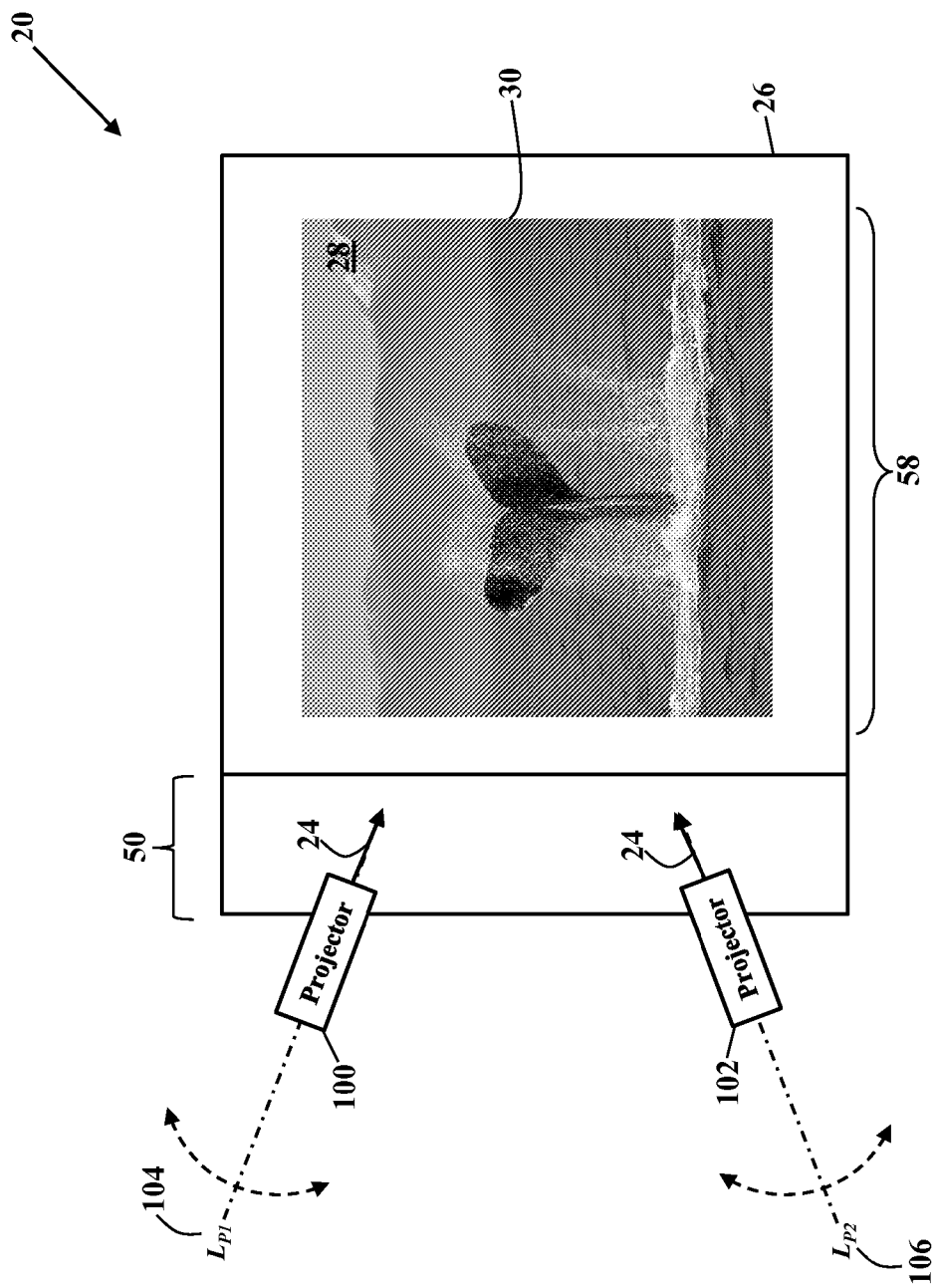
FIGS. 7-8 are schematics illustrating multiple projectors, according to exemplary embodiments.
Figure 8:
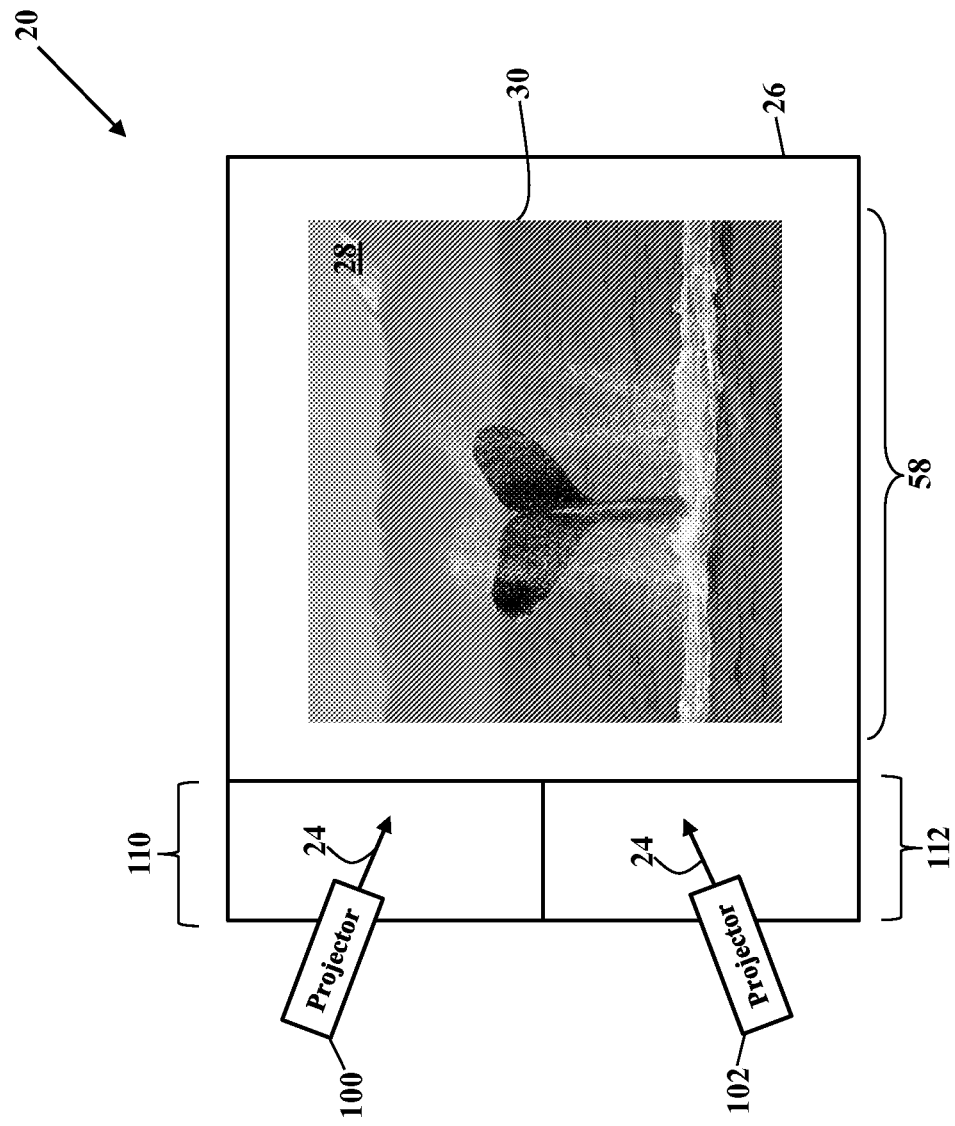
Figure 9:
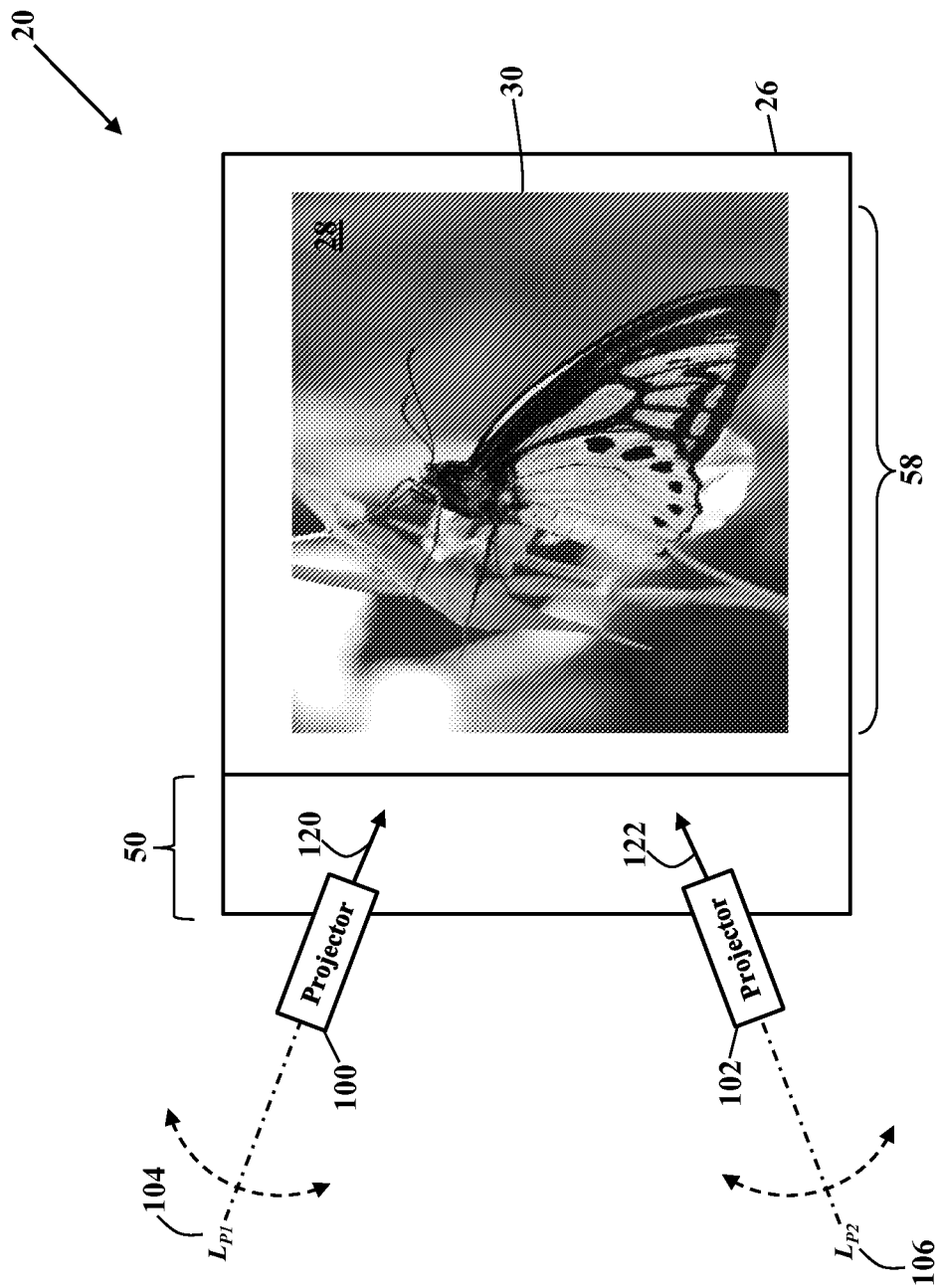
FIGS. 9-12 are schematics illustrating multiple images from multiple projectors, according to exemplary embodiments.

FIGS. 7-8 are schematics illustrating multiple projectors, according to exemplary embodiments. FIG. 7, for example, is a top view of the display device 20 that illustrates multiple projectors injecting the single image 24 into the waveguide 26. A first projector 100, for example, injects the image 24 into the tapered cross-section 50 of the waveguide 26. A second projector 102 may also inject the same image 24 into the tapered cross-section 50 of the waveguide 26. The two separate images 24 are again reflected and focused by the tapered cross-section 50 and withdrawn by the frustrator 28. Because the two separate projectors 100 and 102 inject the same two images 24, the separate images 24 may need to be optically aligned to avoid distortion. The first projector 100, then, may be adjustable about a projection axis $L_{P1}$ (illustrated as reference numeral 104) to aim or align the image 24 output from the first projector 100. The second projector 102, likewise, may also be adjustable about a projection axis $L_{P2}$ (illustrated as reference numeral 106) to aim or align the image 24 output from the second projector 102. The two separate projectors 100 and 102 may need to be adjusted to optically combine the image 24.

FIG. 8 also illustrates multiple projectors. Here, though, each projector may be associated with a corresponding tapered cross-section. The first projector 100, for example, injects the image 24 into a first tapered cross-section 110, while the second projector 102 may also inject the same image 24 into a second tapered cross-section 112. The first tapered cross-section 110 reflects and focuses the image 24 to create total internal reflectance in the central region 58 of the waveguide 26. The second tapered cross-section 112 also reflects and focuses the image 24 into the central region 58 of the waveguide 26. The first tapered cross-section 110 and the second tapered cross-section 112, though, are configured to optically align each frustrated image 30 that is withdrawn by the frustrator 28. The two separate images 24 are thus optically combined to visually produce a single frustrated image 30.

Figure 10:
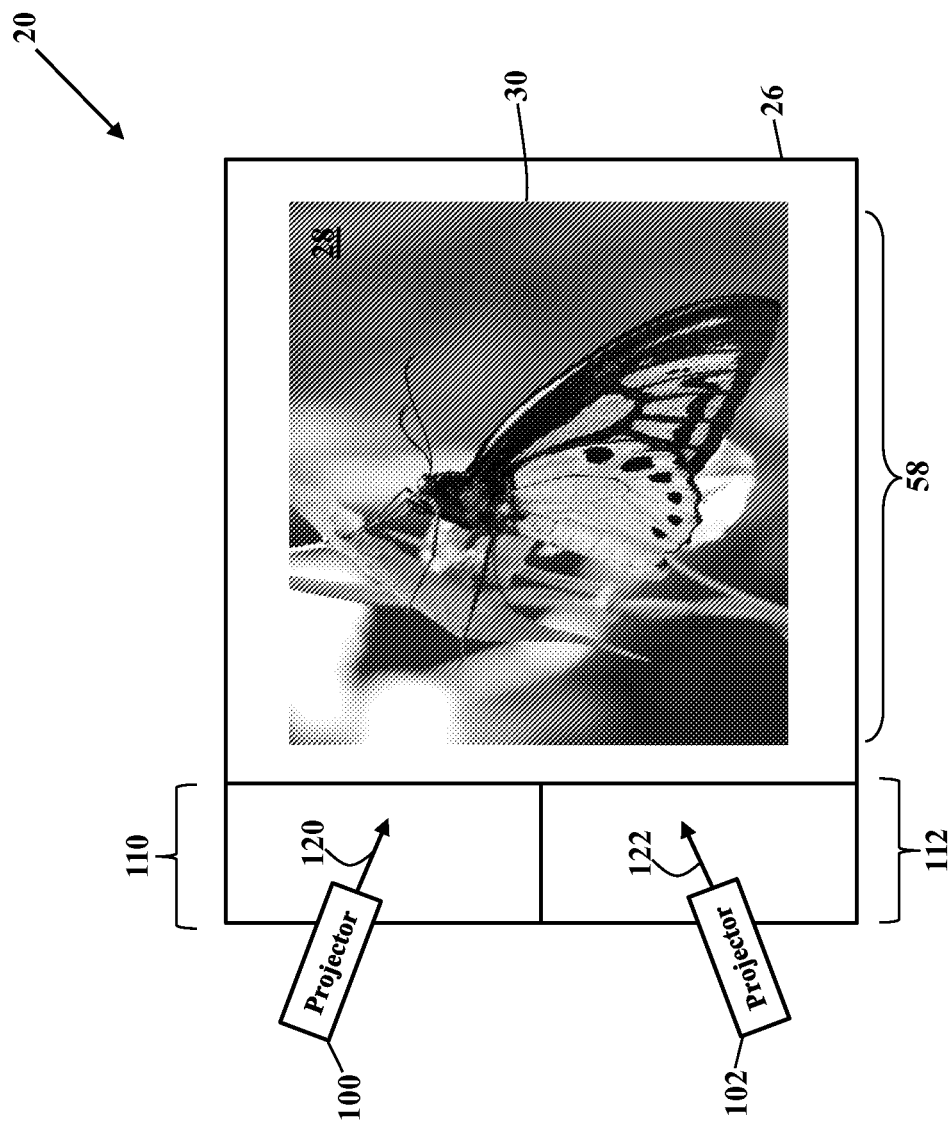

FIGS. 9-12 are schematics illustrating multiple images from multiple projectors, according to exemplary embodiments. Here the first projector 100 injects a first image 120 into the tapered cross-section 50 of the waveguide 26, while the second projector 102 injects a different, second image 122. The first image 120 and the second image 122 may be complementary, such that their optical combination is withdrawn by the frustrator 28 as the single, frustrated image 30. If optical alignment is needed, each projector 100 and 102 may be aligned or aimed about their respective projection axes $L_{P1}$ and $L_{P2}$ to ensure the output images 120 and 122 are optically combined. As FIG. 10 illustrates, image alignment may additionally or alternatively be achieved using the first tapered cross-section 110 and/or the second tapered cross-section 112. The first image 120 may be reflected, focused, and aligned by the first tapered cross-section 110, while the second image 122 is reflected, focused, and aligned by the second tapered cross-section 112.

Figure 11:
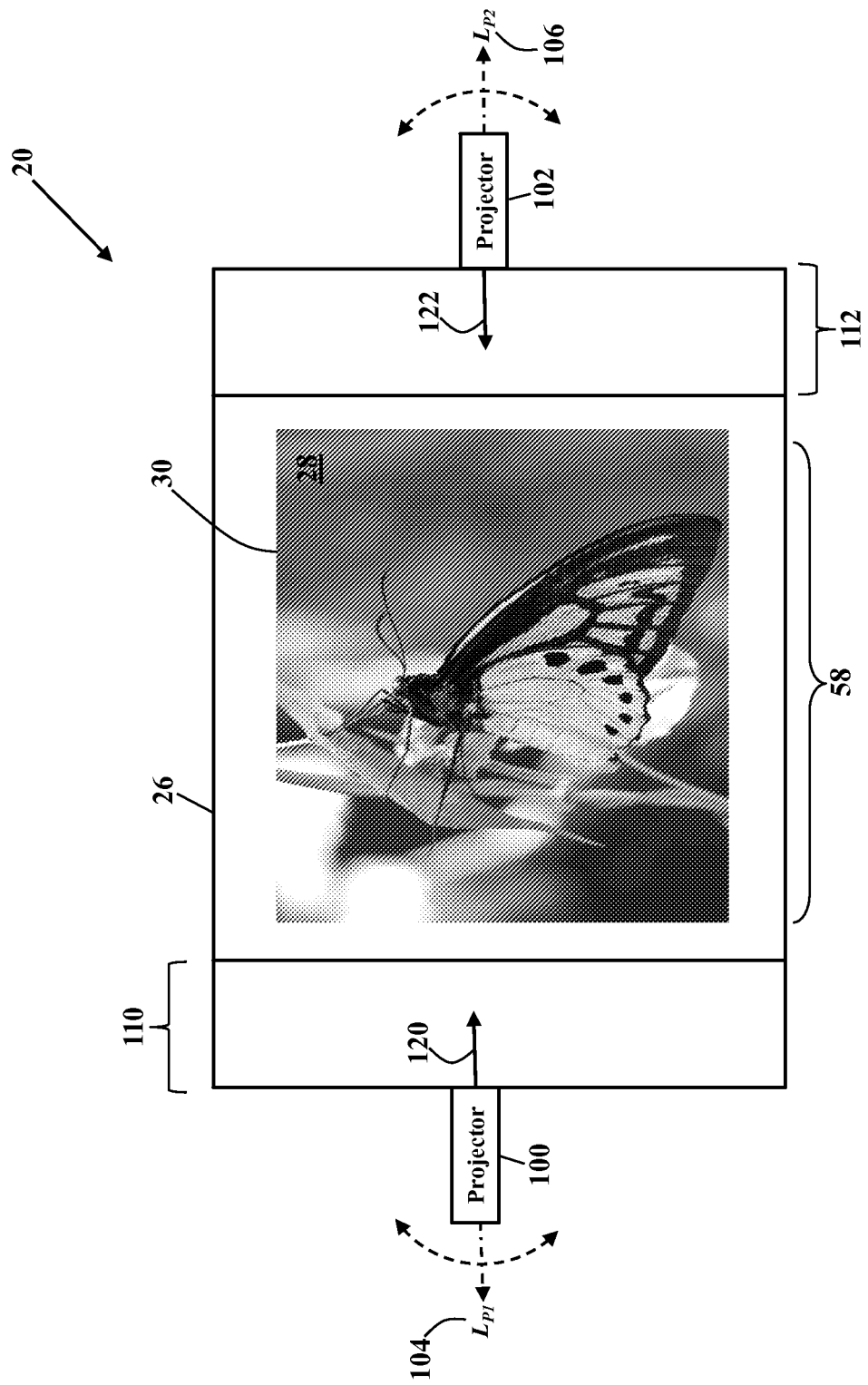
Figure 12:
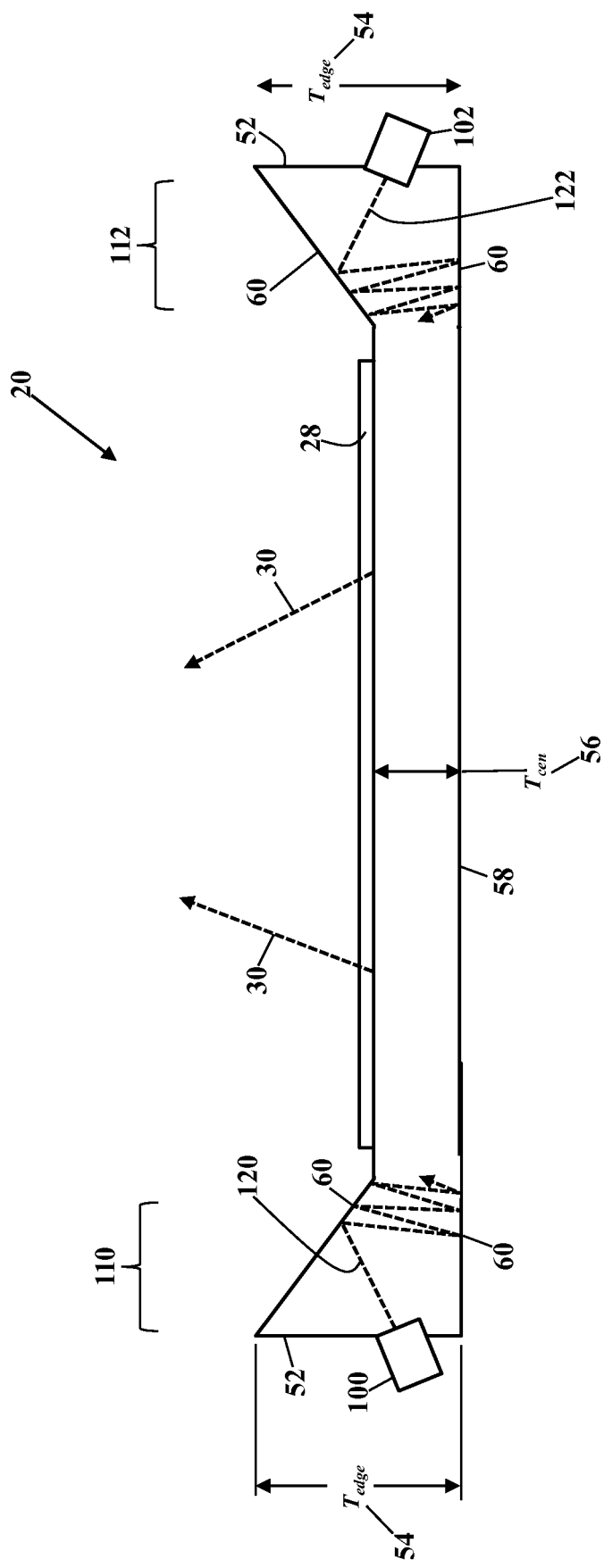

FIGS. 11-12 also illustrate multiple images from multiple projectors. Here, though, the multiple projectors may project different images from different sides of the waveguide 26. As FIG. 11 illustrates, the first projector 100 injects the first image 120 into the corresponding first tapered cross-section 110, while the second projector 102 injects the different, second image 122 into the second tapered cross-section 112. The first tapered cross-section 110 and the second tapered cross-section 112, though, are configured along opposite sides or edges of the waveguide 26. Because the two separate images 120 and 122 may be complementary, each respective tapered cross-section 110 and 112 may reflect, focus, and align the respective images 120 and 122, such that their optical combination is withdrawn by the frustrator 28 as the single, frustrated image 30. Optical alignment may also be accomplished by adjusting each projector 100 and 102 about their respective projection axes $L_{P1}$ and $L_{P2}$.

FIG. 12 is another sectional view of the display device 20 having multiple projectors, according to exemplary embodiments. The first projector 100 injects the first image 120 into the corresponding first tapered cross-section 110, while the second projector 102 injects the different, second image 122 into the second tapered cross-section 112 on the opposite side of the waveguide 26. The first tapered cross-section 110 reflects, focuses, and aligns the first image 120 to create total internal reflectance in the central region 58 of the waveguide 26. The second tapered cross-section 112 also reflects, focuses, and aligns the second image 122 to create total internal reflectance in the central region 58 of the waveguide 26. Because the first image 120 and the second image 122 are aligned, the frustrator 28 withdraws the combined frustrated image 30 from the waveguide 26. Each tapered cross-section 110 and 112 may have the greater cross-sectional thickness $T_{edge}$ (illustrated as reference numeral 54) than the cross-sectional thickness $T_{cen}$ (illustrated as reference numeral 56) of the thinner central region 58 of the waveguide 26.

Figure 13:
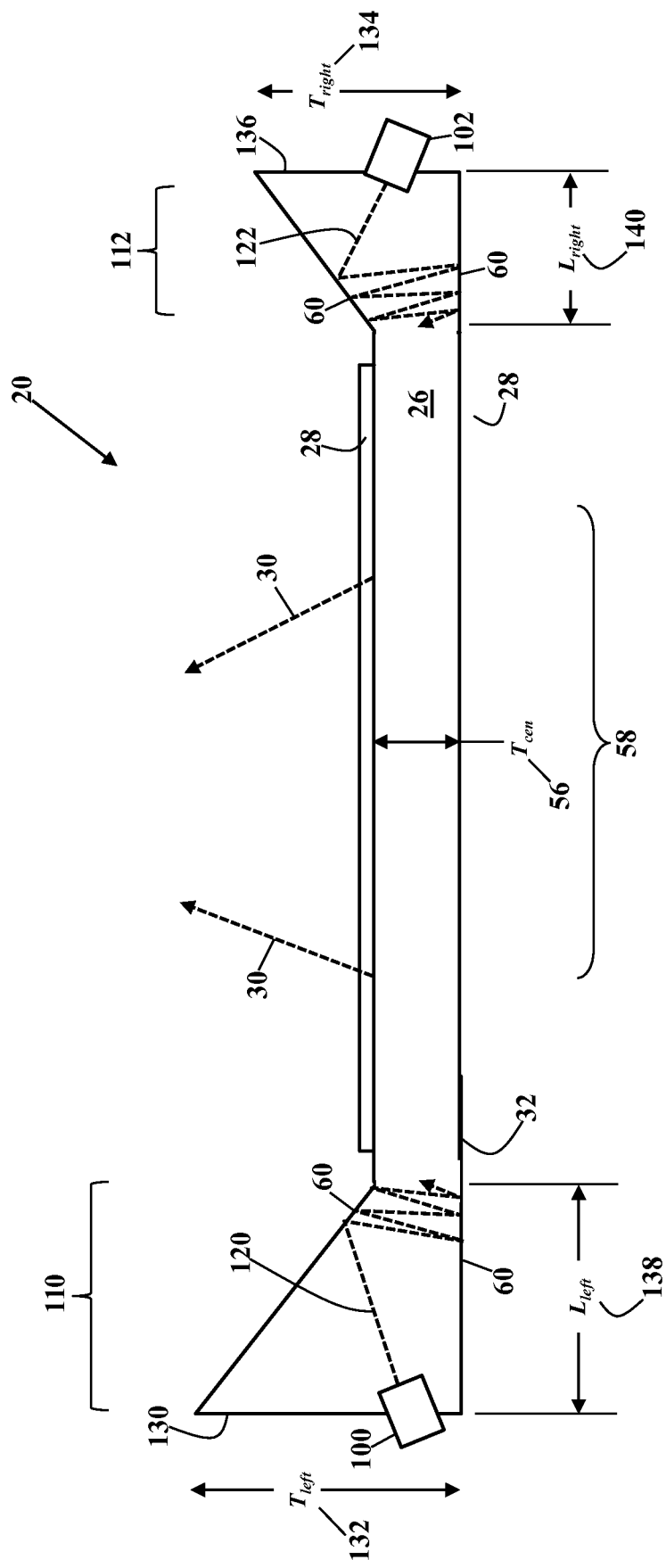
FIG. 13 is another sectional view of the display device illustrating differing cross-sectional areas, according to exemplary embodiments.

FIG. 13 is another sectional view of the display device 20, according to exemplary embodiments. Here, though, the tapered cross-sections 110 and 112 may have different cross-sectional areas, depending on design criteria and/or the optical properties desired in the waveguide 26. As FIG. 13 illustrates, the first tapered cross-section 110 (illustrated at a left edge 130 of the waveguide 26) may have a greater cross-sectional thickness $T_{left}$ (illustrated as reference numeral 132) than a cross-sectional thickness $T_{right}$ (illustrated as reference numeral 134) of the second tapered cross-section 112 (illustrated at a right edge 136 of the waveguide 26). The first tapered cross-section 110 may, likewise, have a greater or longer cross-sectional length $L_{left}$ (illustrated as reference numeral 138) than a cross-sectional length $L_{right}$ (illustrated as reference numeral 140) of the second tapered cross-section 112. The thicknesses and lengths of the tapered cross-sections 110 and 112 may be unequal to achieve different focusing and/or alignment objectives.

Figure 14:
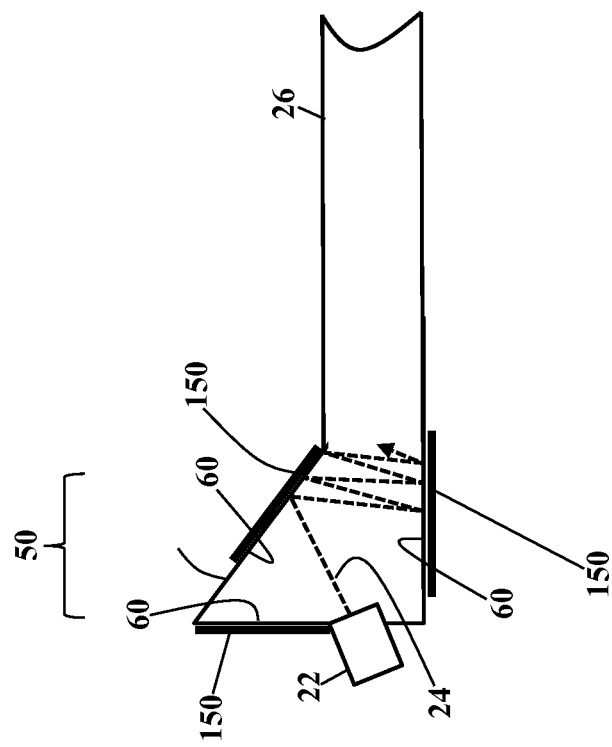
FIG. 14 is a partial sectional view illustrating encasement of the image 24, according to exemplary embodiments.

FIG. 14 is a partial sectional view illustrating encasement of the image 24, according to exemplary embodiments. Here exemplary embodiments may further include features that encase or retain the image 24 for total reflection within the tapered cross-section 50 (or reference numerals 110 and 112). Because the tapered cross-section 50 reflects and focuses the image 24 for total internal reflection, the tapered cross-section(s) may further have features for reducing, or even preventing, refraction of the image 24. As the image 24 encounters the angled surface(s) 60, some of the image 24 may refract at a boundary interface. That is, some of the incident image 24 may reflect and some of the incident image 24 may transmit through the tapered cross-section 50 and into another medium (e.g., air or argon). Because total internal reflection is desired, any of the angled surface(s) 60 may have an encasement feature 150. The encasement feature 150 ensures the image 24 reflects with minimal or no refracting. The encasement feature 150, for example, may be any metallic or non-metallic coating or cladding that causes the image 24 to completely, or nearly completely, reflect at any angled surface 60 within the tapered cross-section 50. The encasement feature 150 may be applied to an inner surface within the tapered cross-section 50, and/or the encasement feature 150 may be applied to an outer surface. The encasement feature 150 may be embedded within a wall thickness of the tapered cross-section 50, such as reflective particles. The encasement feature 150 may be a reflective foil or film that is applied to, or deposited onto, an inner or outer surface of the tapered cross-section 50. The encasement feature 150 may also be a physical reflector, although a reflector is less optically efficient (as refraction has occurred). The encasement feature 150 may entirely or partially extend, or be applied, along an entire length of the angled surface 60. Regardless, the encasement feature 150 ensures the image 24 reflects with minimal or no refracting.

Figure 15:
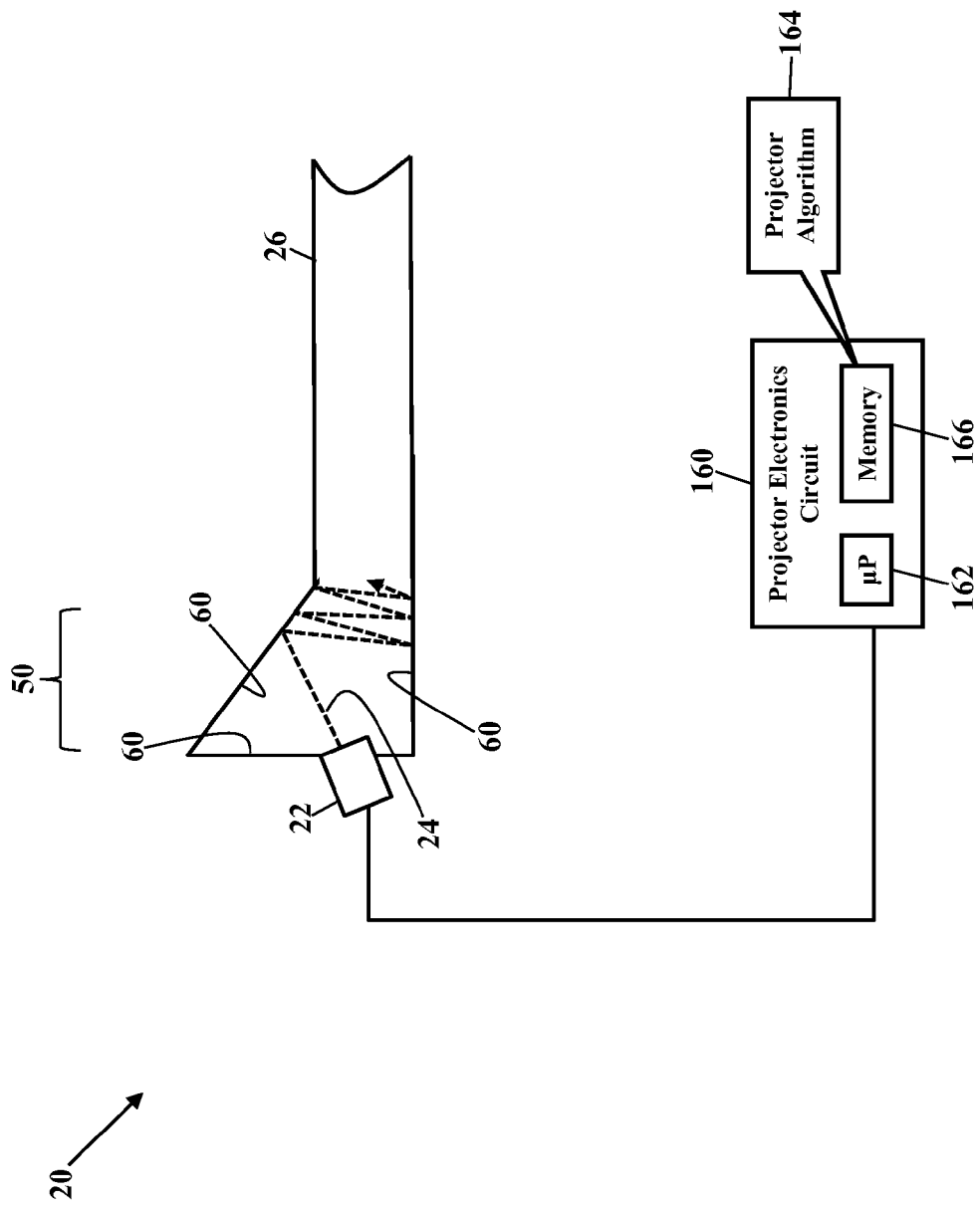
FIG. 15 is a block diagram further illustrating the display device 20, according to exemplary embodiments.

FIG. 15 is a block diagram further illustrating the display device 20, according to exemplary embodiments. Here the display device 20 may include a projector electronics circuit 160. The projector electronics circuit 160 causes the projector 22 to output the image 24. A processor 162 (e.g., "µP"), application specific integrated circuit (ASIC), or other component may execute a projector algorithm 164 stored in a memory 166. The projector algorithm 164 includes code or instructions may cause the processor 162 to control the projector electronics circuit 160 and/or the projector 22. The projector electronics circuit 160 may also apply a voltage that electrically powers the projector 22. The projector algorithm 164 may even cause the processor 162 to command an audible device (e.g., speaker, piezoelectric, or vibrator) to produce sounds and other audible features.

Figure 16:
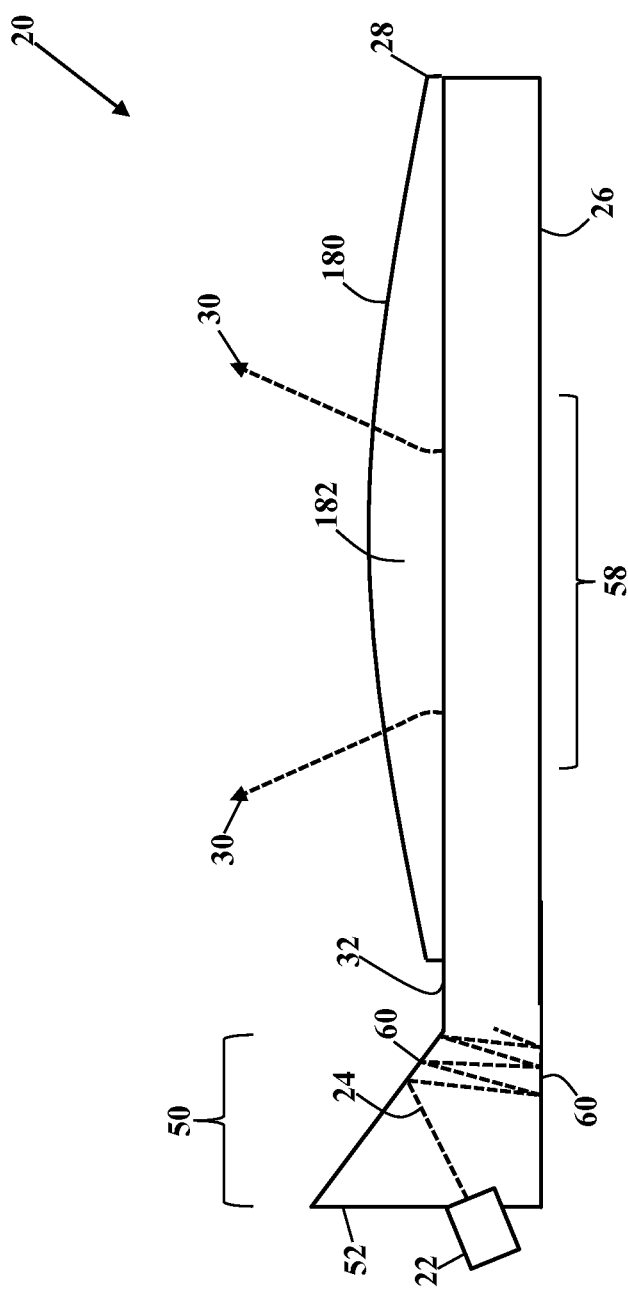
FIG. 16 is a schematic illustrating magnification, according to exemplary embodiments.

FIG. 16 is a schematic illustrating magnification, according to exemplary embodiments. Here the frustrator 28 may magnify the frustrated image 30 withdrawn from the waveguide 26. As FIG. 16 illustrates, the frustrator 28 may have features that optically magnify the frustrated image 30. An outer surface 180 of the frustrator 28, for example, may have a convex cross-sectional contour 182, thus acting as a magnifying lens to enlarge an appearance of the frustrated image 30. Magnification may be especially useful for cell phones, e-readers, and other devices with small displays. Exemplary embodiments, however, may also de-magnify (such as when the outer surface 180 of the frustrator 28 has a concave cross-sectional contour).

Figure 17:
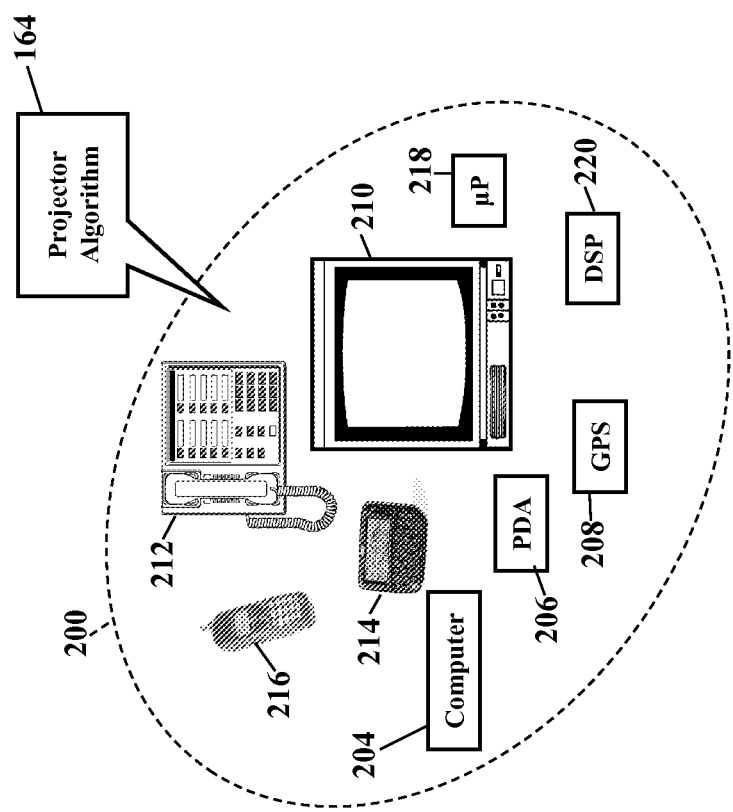
FIG. 17 is a schematic illustrating still more exemplary operating environments.

FIG. 17 is a schematic illustrating still more exemplary embodiments. FIG. 17 illustrates that the display device 20 and/or the projector algorithm 162 may operate within any processor-controlled device 200. The processor-controlled device 200, for example, may be a computer 204, personal digital assistant (PDA) 206, a Global Positioning System (GPS) device 208, television 210, an Internet Protocol (IP) phone 212, a pager 214, a cellular/satellite phone 216, or any system and/or communications device utilizing a digital processor 218 and/or a digital signal processor (DP/DSP) 220. The processor-controlled device 200 may also include watches, radios, vehicle electronics, clocks, printers, gateways, mobile/implantable medical devices, and other apparatuses and systems. Indeed, the processor-controlled device 200 may be any device having any type of display device. Because the architecture and operating principles of the various processor-controlled devices 200 are well known, the hardware and software componentry of the various processor-controlled devices 200 are not further shown and described.

FIG. 18 is another partial sectional view illustrating the display device 20, according to exemplary embodiments. Here the tapered cross-section 50 (or reference numerals 110 and 112) may further include a radius 300 of curvature that helps obtain total internal reflection (or "TIR") within the waveguide 26. The radius 300 of curvature may be molded, attached, or fabricated at any portion of the tapered cross-section 50. FIG. 18, for example, illustrates a side 302 having a convex curvature 304 that outwardly bows from the tapered cross-section 50. The radius 300 of curvature, however, may have a convex curvature 306. As FIG. 18 further illustrates, a bottom side 308 may inwardly bow within or into the tapered cross-section 50. One or more sides of the tapered cross-section 50 may include the radius 300 of curvature, and the radius 300 of curvature may be constant or vary along an arc length 310.

Exemplary embodiments may be physically embodied on or in a computer-readable storage medium. This computer-readable medium may include a hard drive, USB drive, CD-ROM, DVD, tape, cassette, floppy disk, memory card, and large-capacity disks. This computer-readable medium, or media, could be distributed to end-subscribers, licensees, and assignees. A computer program product comprises a computer readable medium storing processor-executable instructions for displaying an image.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

What is claimed is:

1. A method, comprising:
injecting an image into a tapered portion of a waveguide;
reflecting the image within the tapered portion to create total internal reflectance in the waveguide;
applying a frustrator to a surface of the waveguide;
withdrawing, through the surface, a frustrated image from the waveguide; and
displaying the frustrated image.

2. The method according to claim 1, further comprising diffusing the frustrated image to enhance perception to a viewer.

3. The method according to claim 1, further comprising magnifying the frustrated image to enhance perception to a viewer.

4. The method according to claim 1, further comprising reflecting the frustrated image at an angled surface of the tapered portion of the waveguide.

5. The method according to claim 1, further comprising focusing the frustrated image into the tapered portion of the waveguide.

6. The method according to claim 1, further comprising injecting a second image into the waveguide.

7. The method according to claim 1, further comprising refracting the frustrated image.

8. An apparatus, comprising:
a waveguide having an edge and a tapered portion;
a projector injecting an image into the edge of the waveguide, the image reflecting within the tapered portion of the waveguide at an angle that creates total internal reflectance in a central portion of the waveguide; and
a frustrator applied to a surface of the waveguide, the frustrator withdrawing a frustrated image through the surface of the waveguide for display.

9. The apparatus according to claim 8, further comprising a reflective material on the tapered portion of the waveguide to reflect the image.

10. The apparatus according to claim 8, further comprising a diffuser that diffuses the frustrated image.

11. The apparatus according to claim 8, further comprising a diffuser that refracts the frustrated image.

12. The apparatus according to claim 8, further comprising a magnifying feature that magnifies the frustrated image.

13. The apparatus according to claim 8, further comprising an angled surface of the tapered portion of the waveguide that reflects the image.

14. The apparatus according to claim 8, further comprising a second projector that also injects the image into the waveguide.

15. The apparatus according to claim 8, further comprising a second projector that injects a second image into the waveguide.

16. The apparatus according to claim 8, further comprising a circuit that applies a voltage to the projector.

17. A device, comprising:
a waveguide having an edge and a tapered portion;
a projector injecting an image into the edge of the waveguide, the image reflecting within the tapered portion of the waveguide at an angle that creates total internal reflectance in a central portion of the waveguide; and
a frustrator applied to a surface of the waveguide, the frustrator withdrawing a frustrated image through the surface for display.

* * * * *